(12) United States Patent
O'Mullan et al.

(10) Patent No.: US 8,825,920 B2
(45) Date of Patent: Sep. 2, 2014

(54) FIELD UPGRADABLE FIRMWARE FOR ELECTRONIC DEVICES

(75) Inventors: Sean Michael O'Mullan, Austin, TX (US); Bradley E. Sundahl, Austin, TX (US); Gregory Charles Yancey, Austin, TX (US); Allan Parker, Austin, TX (US); Arthur Benjamin Oliver, Austin, TX (US); John Anthony Darilek, Bastrop, TX (US)

(73) Assignee: Spansion LLC, Sunnyvale, CA (US)

( * ) Notice: Subject to any disclaimer, the term of this patent is extended or adjusted under 35 U.S.C. 154(b) by 0 days.

(21) Appl. No.: 12/690,617

(22) Filed: Jan. 20, 2010
(Under 37 CFR 1.47)

(65) Prior Publication Data
US 2011/0179195 A1    Jul. 21, 2011

(51) Int. Cl.
*G06F 3/00* (2006.01)
*G06F 9/445* (2006.01)
*G06F 21/57* (2013.01)
*G06F 3/12* (2006.01)

(52) U.S. Cl.
CPC ............... *G06F 8/65* (2013.01); *G06F 21/572* (2013.01); *G06F 3/123* (2013.01)
USPC ............................................. 710/16; 717/168

(58) Field of Classification Search
CPC ............................... G06F 3/123; G06F 21/572
USPC .............................................................. 710/16
See application file for complete search history.

(56) References Cited

U.S. PATENT DOCUMENTS

| | | | |
|---|---|---|---|
| 6,631,520 B1 * | 10/2003 | Theron et al. | 717/173 |
| 7,880,590 B2 * | 2/2011 | Jam et al. | 340/10.51 |
| 2005/0125649 A1 * | 6/2005 | Lu et al. | 713/1 |
| 2005/0132160 A1 * | 6/2005 | Everett et al. | 711/170 |
| 2006/0143344 A1 * | 6/2006 | Lindsay et al. | 710/105 |
| 2006/0174240 A1 * | 8/2006 | Flynn | 717/170 |
| 2007/0016618 A1 * | 1/2007 | Robert et al. | 707/200 |
| 2008/0040818 A1 * | 2/2008 | Iima et al. | 726/36 |
| 2008/0127356 A1 * | 5/2008 | Hsu et al. | 726/30 |

* cited by examiner

*Primary Examiner* — Henry Tsai
*Assistant Examiner* — John Roche
(74) *Attorney, Agent, or Firm* — Sterne, Kessler, Goldstein & Fox P.L.L.C.

(57) ABSTRACT

An electronic device includes an input/output (I/O) interface and a plurality of memory elements comprising a non-volatile memory portion for storing a default firmware and a working memory portion having a firmware area. The device also includes a controller coupled to the I/O interface and the memory elements, where the controller is configured for operating the memory elements, according to the firmware area, and for monitoring the I/O interface. In the device, the controller is also configured for loading the default firmware into the firmware area when the controller is enabled and for granting access to the firmware area for loading an alternate firmware if a bypass code is detected at the I/O interface.

15 Claims, 8 Drawing Sheets

300

400

500

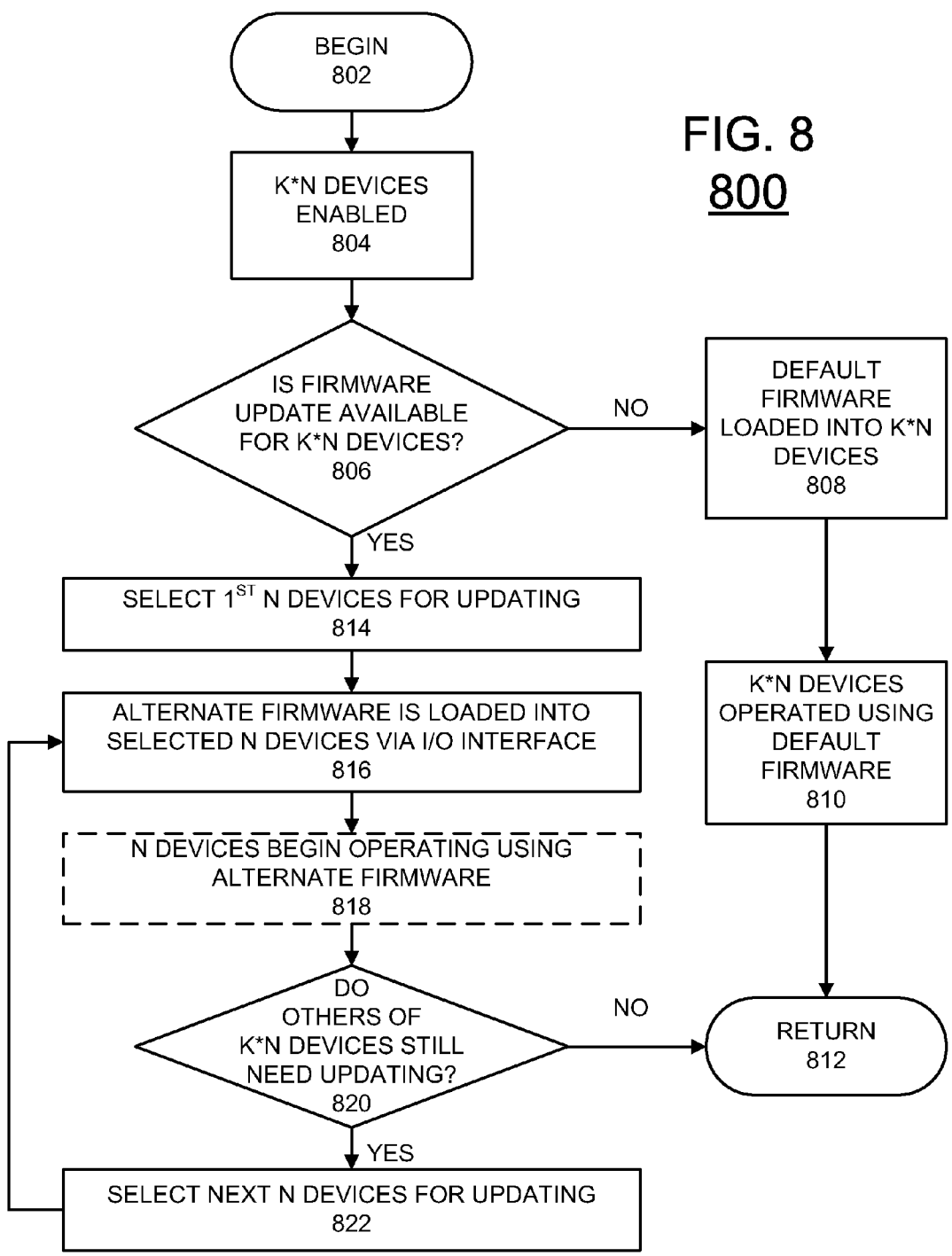

FIELD UPGRADABLE FIRMWARE FOR ELECTRONIC DEVICES

BACKGROUND OF THE INVENTION

1. Statement of the Technical Field

The invention is directed to the field of firmware for electronic devices, and more particularly, to systems and methods for upgrading firmware in electronic devices.

2. Description of the Related Art

Many types of electronic devices, including standalone and peripheral devices, operate using some form of firmware. In general, firmware provides various settings and algorithms that specify how an electronic device should operate and how the device should communicate with other devices. Firmware is typically stored in the electronic device using some type of non-volatile memory and loaded into a working memory of the device upon power-up or enabling of the electronic device. Once the firmware is loaded, the electronic device performs operations according to the firmware. Although some types of electronic devices have been designed to allow firmware to be upgraded in the field to improve performance of the device (e.g., computer motherboard bios), other types of electronic devices generally require specialized hardware for performing such upgrades. For example, non-volatile memory used for storing firmware in a memory module typically needs high voltage signals to provide access to this firmware. Generally, these are voltages exceeding the voltages available at the memory module interfaces of conventional end-user computing system. As a result, most memory devices require that they be sent back to their manufacturer for purposes of updating their firmware. Accordingly, the inconvenience and cost of perform such firmware upgrades general results in many computing systems using one or more devices configured with older, performance-limiting firmware.

BRIEF DESCRIPTION OF THE DRAWINGS

Non-limiting and non-exhaustive embodiments of the invention are described with reference to the following drawings, in which:

FIG. 8 is a flow diagram of an exemplary method 800 for field upgrading firmware in multiple electronic devices in accordance with an embodiment of the invention.

DETAILED DESCRIPTION

Figure 1:
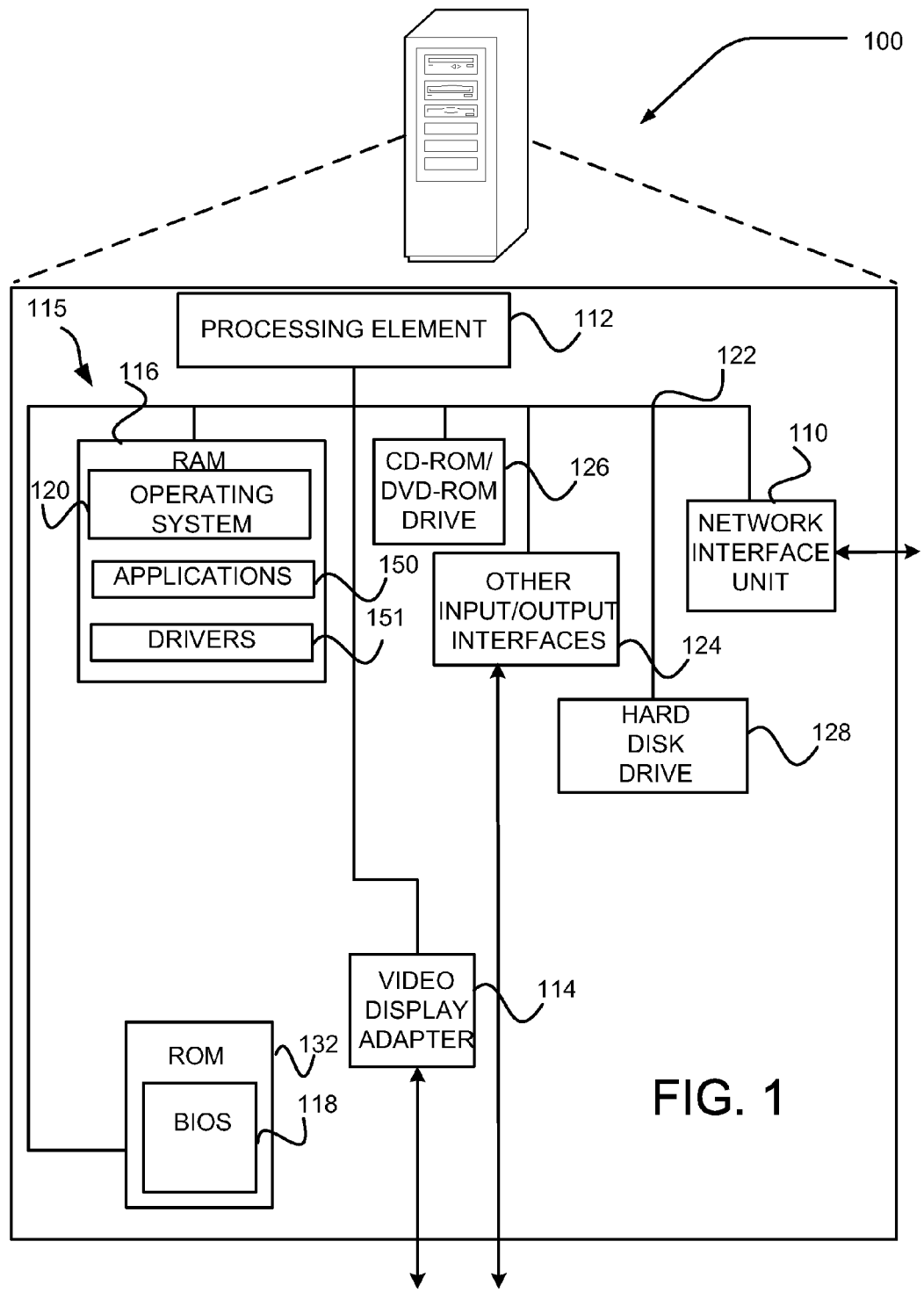
FIG. 1 is a block diagram of an exemplary computing system configured in accordance with an embodiment of the invention.

The invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Briefly stated, embodiments of the invention are related to systems and methods for field upgrading firmware in an electronic device. As described above, one of the problems with upgrading firmware in an electronic device is that specialized equipment may be needed for certain types of devices, particularly electronic devices for use with computing systems. To overcome the limitations of conventional systems, the various embodiments of the invention provide a system and method for field upgrading firmware in an electronic device without the need for specialized or additional hardware. In particular, the various embodiments of the invention provide an electronic device configured to allow loading of an alternate firmware from an input/output (I/O) interface via the use of bypass codes or keys provided at the I/O interface. The firmware can be temporarily or permanently updated. Additionally, the firmware for the electronic device can be upgraded during or after power-up or enabling of the electronic device. In some embodiments of the invention, a completion signal can also be provided at the I/O interface to signal to the electronic device that the upgrade is complete.

FIG. 1 is a block diagram of an exemplary computing system 100 configured in accordance with an embodiment of the invention. System 100 may include many more components than those shown. The components shown, however, are sufficient to disclose an illustrative embodiment for practicing the invention.

System 100 includes processing element 112, video display adapter 114, and a mass memory 115, all in communication with each other via bus 122. Processing element 112 can include one or more processing elements. Mass memory 115 generally includes system RAM 116, read-only memory (ROM) 132, and one or more permanent mass storage devices, such as hard disk drive 128, tape drive, optical drive, and/or floppy disk drive. System 100 can also include one or more other I/O interfaces 124 for supporting communications with other types of electronic devices.

In system 100, any general-purpose operating system may be employed. Basic input/output system ("BIOS") 118 is also provided for controlling the low-level operation of server 100. As illustrated in FIG. 1, system 100 also can communicate with the Internet, or some other communications network, via network interface unit 110, which is constructed for use with various communication protocols including the TCP/IP protocol. Network interface unit 110 is sometimes known as a transceiver, transceiving device, network interface card (NIC), and the like.

Mass memory 115 as described above illustrates a type of processing element-readable storage media, which may include volatile, nonvolatile, removable, and non-removable media implemented in any method or technology for storage of information, such as processing element readable instructions, data structures, program modules, or other data. Examples of processing element readable storage media include DRAM, SRAM, flash or other semiconductor memory devices, CD-ROM, digital versatile disk (DVD), or other optical storage devices, magnetic cassettes, magnetic tape, magnetic disk storage or other magnetic storage devices. The various embodiments of the invention can also any other medium which can be used to store information and which can be accessed by an electronic device.

System RAM 116 also stores program code and data. An operating system 120, one or more applications 150, and drivers 151 are loaded into system RAM 116 to operate computing system 100. Examples of application programs include email programs, schedulers, calendars, web services, transcoders, database programs, word processing programs, spreadsheet programs, firmware update programs, and so forth. Examples of drivers are video display drivers, memory device drivers, and network interface drivers.

Figure 2:
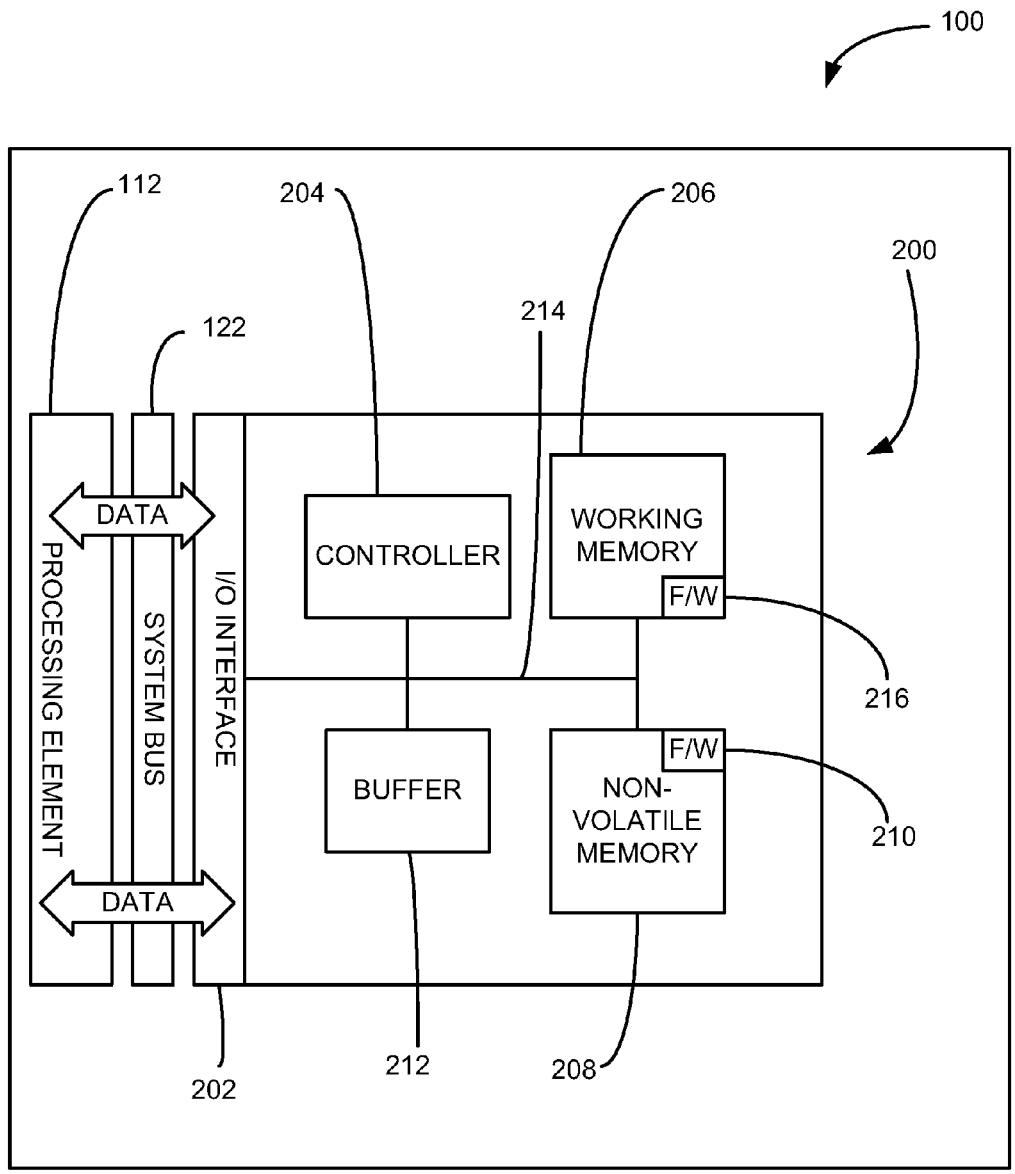
FIG. 2 is a detailed block diagram of an exemplary electronic device in the computing system of FIG. 1 configured in accordance with an embodiment of the invention.

FIG. 2 is a detailed block diagram of an exemplary electronic device 200 in system 100 configured in accordance with an embodiment of the invention. Device 200 may include many more components than those shown. The components shown, however, are sufficient to disclose an illustrative embodiment for practicing the invention.

Although the various embodiments of the invention will be described below at times with respect to a memory module device, the invention is not limited in this regard. In the various embodiments of the invention, device 200 can be, for example, a memory module for RAM 116 or ROM 132 in FIG. 1. Device 200 can also be any of components 110, 114, 126, and 128 in FIG. 1. Device 200 can further be any other device coupled to interface 124 in FIG. 1 or any other device otherwise coupled to system 100.

As shown in FIG. 2, device 200 has an I/O interface 202 is coupled to system bus 122 of system 100. Via I/O interface 202, device 200 exchanges data with processing element 122 of system 100. Device 200 also includes device processing element or controller 204 for controlling operations of device 200. Device 200 further includes a working memory 206 for storing data used by controller 204 during operation of device 200. Device 200 also includes non-volatile memory 208. Non-volatile memory 208 can be used to provide persistent storage of data, including user data and firmware. The firmware can be stored in firmware portion 210 of non-volatile memory 206. In general, firmware portion 208 is a read-only memory in device 200, when operating in system 100. However, as described in greater detail below, device 200 can be configured to allow modification of firmware portion 208. Additionally, device 200 also includes buffer memory 210 accessible via I/O interface. In device 200, components 202, 204, 206, 208, and 212 can be communicatively coupled via a device bus 214.

In a normal mode of operation, device 200 operates as follows. First, device 200 is enabled. Such enablement can be based on providing power to device 200 or by connection of device 200 to system bus 122. Once device 200 is enabled, controller 204 loads the firmware stored in firmware portion 210 of non-volatile memory 208 to a firmware portion 216 of working memory 206. Once the firmware is loaded into working memory 206, controller 204 uses the settings and algorithms in the firmware portion 216 to manage the exchange data between device 200 and processing element 112. To receive data, processing element 112 transmits the data via system bus 122 to I/O interface 202. The data can be read by controller 202 via device bus 214, processed using working memory 216, and/or stored in a portion of working memory 206 or a portion of non-volatile memory 208. To transmit data, controller 204 (in response to a signal from processing element 112 or other external input) retrieves the data from one of working memory 206 or non-volatile memory 208 and stores it in buffer memory 212. The retrieved data can then be read via I/O interface 202 by processing element 112.

As described above, an end-user computing system being used with certain types of electronic devices, such as memory modules, generally lacks at least the type of hardware required for programming the firmware of the electronic device using conventional means. For example, firmware programming for memory module devices typically requires signals at higher voltages than typically available via a conventional I/O interface of a typical computing system. Despite these limitations, it is generally recognized that performance of electronic devices can be enhanced by using upgraded firmware. For example, in the case of memory modules, new settings or algorithms in the firmware can provide improved write performance, cycling performance, and data integrity. Although, devices and systems could be designed to permit direct access to the firmware by end users, it is generally desirable to limit such access, as improper firmware programming can lead to errors or even device inoperability. As a result, the firmware in conventional electronic devices is generally inaccessible via an I/O interface during normal device operations. Rather, such devices must typically be removed and reprogrammed using specialized hardware and software components.

Therefore, as described above, the various embodiments of the invention provide access to firmware in an electronic device via a conventional I/O interface during normal operations. The term "normal operations", as used herein refers to the type of operations the electronic device was designed to perform in conjunction with a computing system. In the various embodiments of the invention, access to the firmware and changes thereof (temporary or permanent) is controlled via bypass codes or keys generated by a computing system. For example, as described below with respect to FIGS. 3-6. Thus, access can be limited to reduce the likelihood of improper programming. Such a configuration therefore allows updated firmware to be used with electronic devices with a reduced risk of rendering the device inoperable.

By allowing updating of the firmware during normal operations of the electronic device, some types of compatibility problems can also be resolved. For example, certain versions of firmware can be incompatible with certain software and hardware configurations. Accordingly, the various embodiments of the invention provide systems and methods that enable firmware to be adjusted dynamically as needed for a particular configuration. For example, a particular firmware version can be associated with an application and can be loaded each time the application is used.

In the various embodiments of the invention, software in the computing system can be configured to generate a bypass code or key for the controller. For example, a computer program running on system 100 can generate a bypass code for device 200. Such a configuration allows any type of computing system, including legacy systems, to generate bypass codes without requiring additional hardware.

In the various embodiments of the invention the firmware update signals can be provided to the I/O interface of the electronic device in a variety of ways. For example, in some embodiments of the invention, a dedicated firmware update application or user interface can be executed on a computing system and used to perform firmware updates. In other embodiments of the invention, update instructions can be incorporated in particular software applications, as described above, to resolve compatibility problems. In still other embodiments, the firmware updating process can be incorporated into driver loading and device activation processes, where the instructions for loading an alternate firmware are incorporated into a device driver associated with the electronic device. However, the embodiments are not limited to these exemplary embodiments. In the various embodiments of the invention, any type of software configuration can be used to deliver firmware update signals to an I/O interface.

Figure 3:
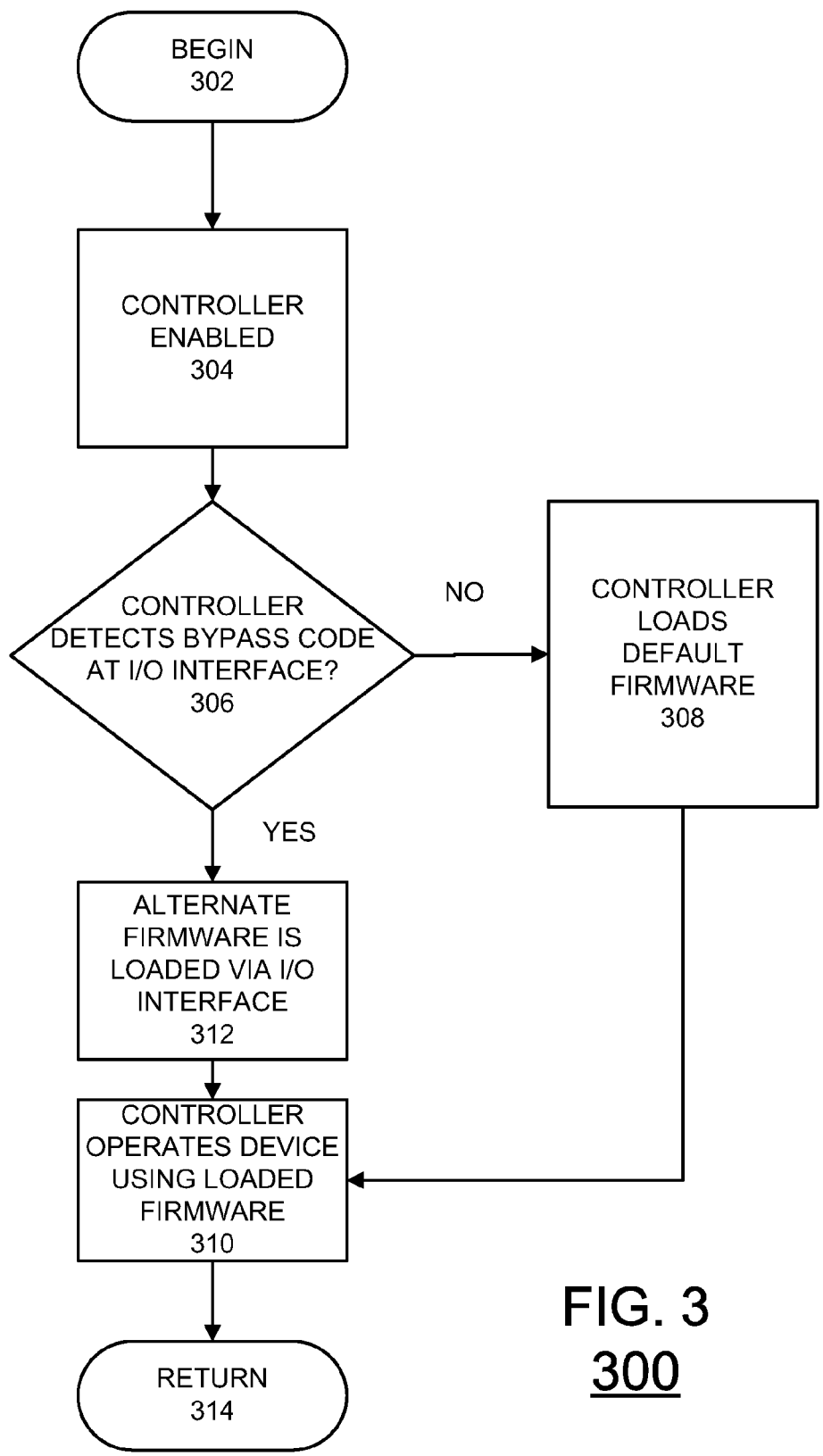
FIG. 3 is a flow diagram of an exemplary method for field upgrading firmware in a electronic device in accordance with an embodiment of the invention.

FIG. 3 is a flow diagram of an exemplary method 300 for field upgrading firmware in an electronic device in accordance with an embodiment of the invention. Method 300 begins at block 302 and continues to block 304. At block 304 the controller in the electronic device is enabled. For example, as described above with respect to FIG. 2, power can be provided to device 200 to activate controller 204 or device 200 can be coupled to system bus 122 of computing system 100. As described above, enabling controller 204 causes controller 204 to begin configuring device 200 for normal operations with system 100. After the controller is enabled at block 304, the controller can proceed with loading the default firmware stored in the electronic device or load an alternate firmware provided by a coupled computing system.

After the controller is enabled at block 304, the controller is configured to monitor an I/O interface. For example, referring to FIG. 2, controller 204 is configured to monitor I/O interface 202. Afterwards, if the controller does not detect a bypass code at the I/O interface at block 306, the controller loads the default firmware into working memory at block 308 and the controller operates the electronic device using the loaded firmware (i.e., the default firmware) at block 310. If the controller does detect a bypass code at the I/O interface at block 306, then an alternate firmware can be loaded via the I/O interface at block 312 and the controller operates the electronic device using the loaded firmware (i.e., the alternate firmware) at block 310. Method 300 then resumes previous processing at block 314.

Although FIG. 3 illustrates that an alternate firmware is selected and loaded for an electronic device when the controller is enabled, the various embodiments of the invention are not limited in this regard. In other embodiments of the invention, an alternate firmware can be loaded even after an electronic device firmware has been loaded, completely or partially, and electronic device has begun operating. For example, FIG. 4 is a flow diagram of an alternate exemplary method 400 for field upgrading firmware in an electronic device in accordance with an embodiment of the invention.

Method 400 begins at block 402 and continues to block 404. At block 404, the controller is enabled and loads the default firmware, as described above with respect to FIGS. 2 and 3. Afterwards, the controller operates the electronic device using the loaded default firmware at block 406. As described above, enabling the controller also configures the controller to begin monitoring the I/O interface. Subsequently, at block 408, if the controller does not detect a bypass code at the I/O interface, the controller continues using the default firmware and resumes previous processing at block 410. If the controller does detect a bypass code at the I/O interface at block 408, then an alternate firmware can be loaded via the I/O interface at block 412 and the controller operates the electronic device using the loaded alternate firmware at block 414. Method 400 then resumes previous processing at block 410. The previous processing at block 410 can include performing tasks associated with normal operation of the device, including repeating method 400.

As described above in methods 300 and 400, upon detection of a bypass code the controller can proceed with loading of an alternate firmware. In the various embodiments of the invention, this loading process can result in the alternate firmware being loaded temporarily or permanently, as illustrated in FIGS. 5 and 6, respectively.

Figure 4:
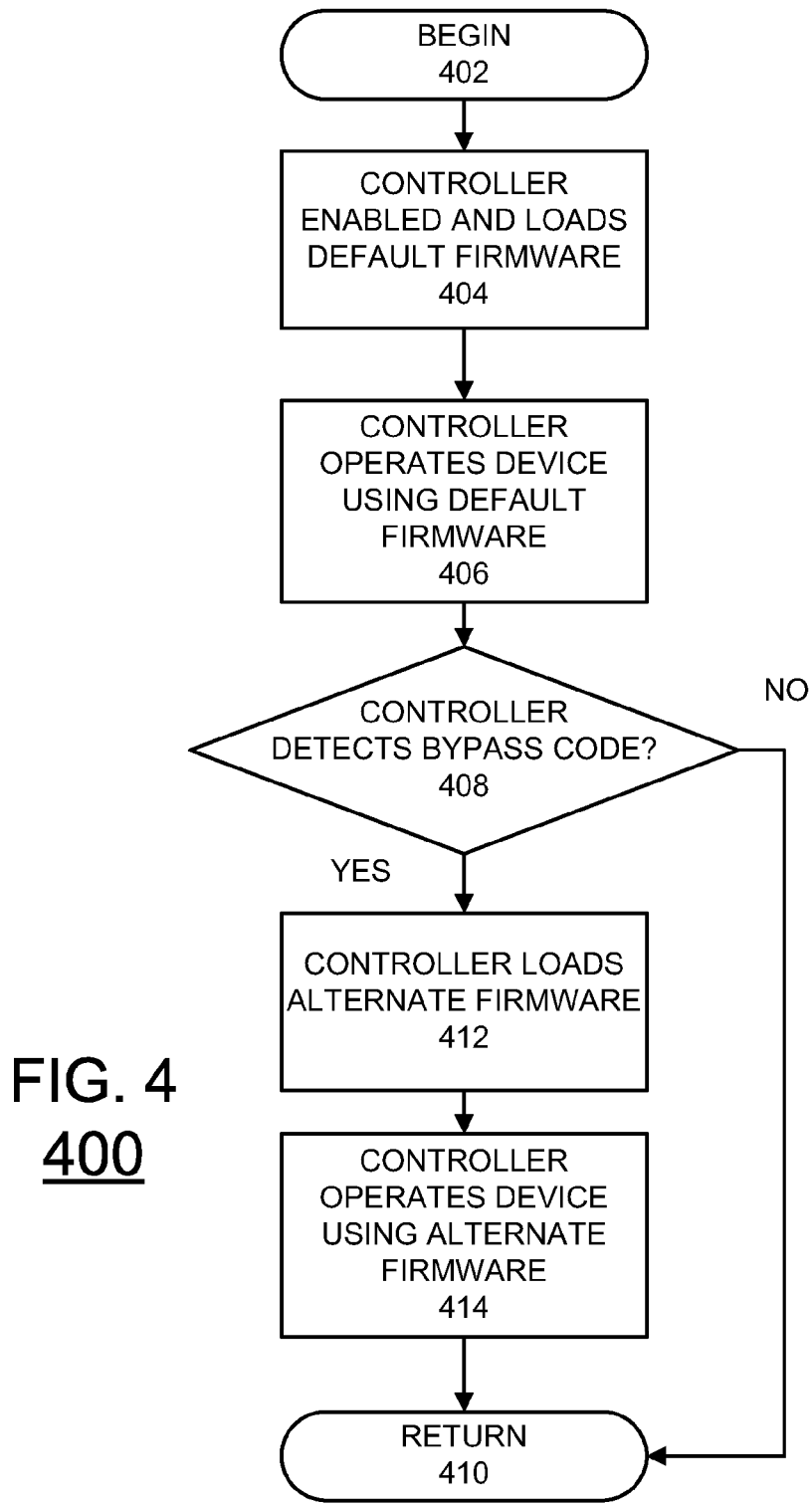
FIG. 4 is a flow diagram of an alternate exemplary method for field upgrading firmware in a electronic device in accordance with an embodiment of the invention.
Figure 5:
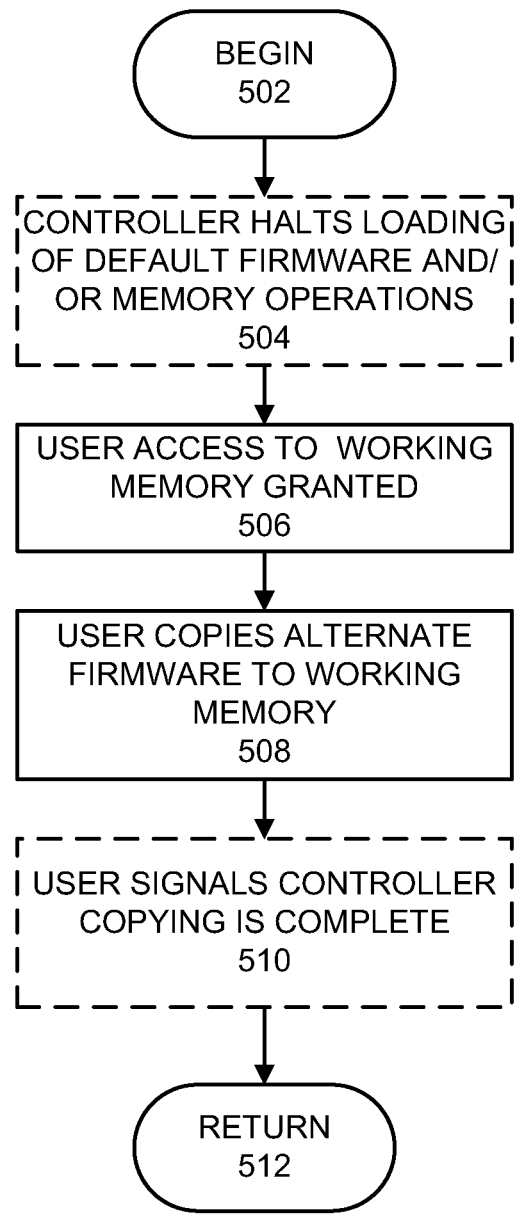
FIG. 5 is a flow diagram of an exemplary method of the step of loading an alternate firmware in FIG. 3 or 4 after a bypass code is detected, in which the firmware is temporarily upgraded.
Figure 6:
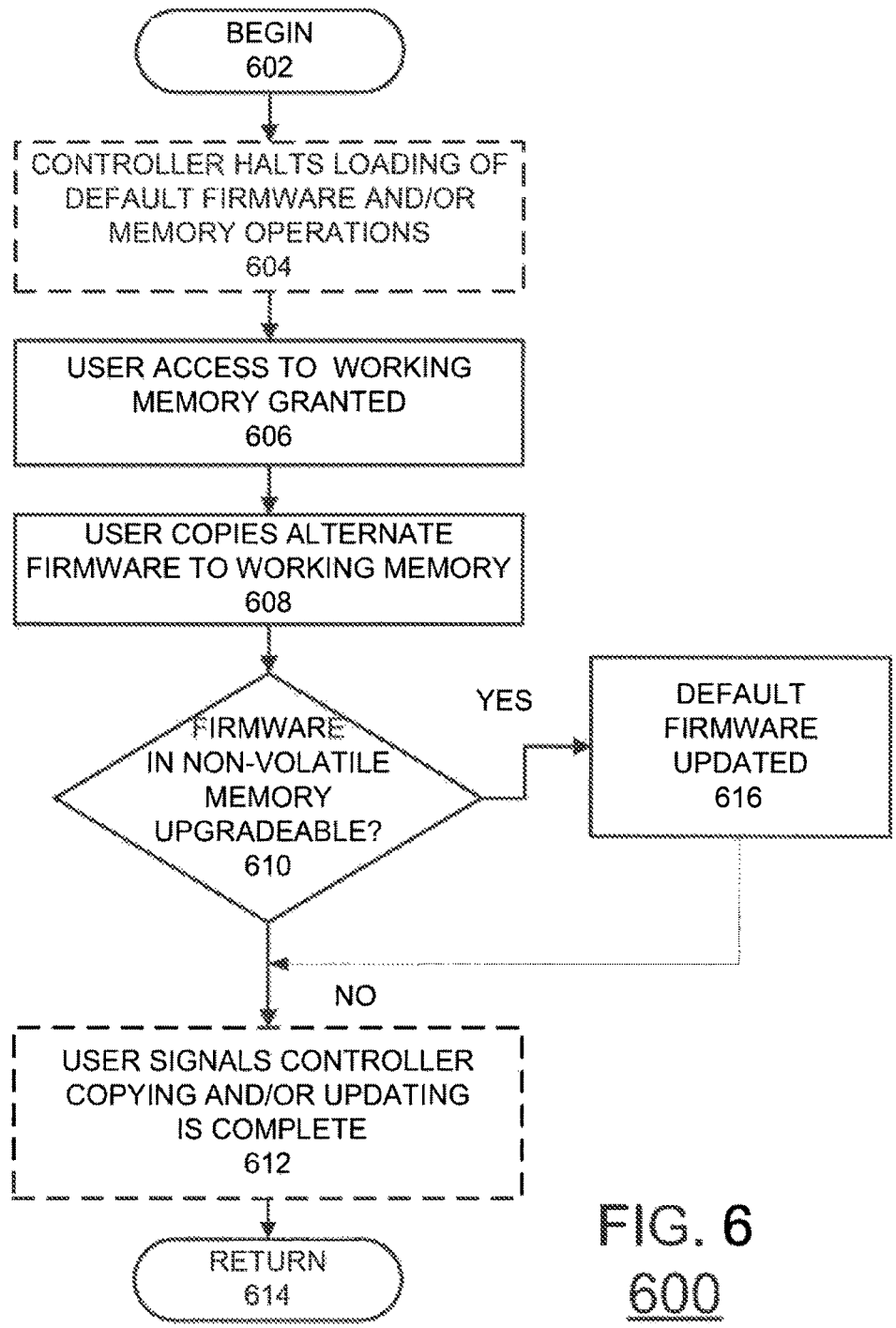
FIG. 6 is a flow diagram of an exemplary method 600 for the step of loading an alternate firmware in FIG. 3 or 4 after a bypass code is detected, in which the firmware is permanently upgraded.

FIG. 5 is a flow diagram of an exemplary method 500 for the step of loading an alternate firmware in FIG. 3 or 4 after a bypass code is detected, in which the firmware is temporarily upgraded. In particular, method 500 results only in modification of the firmware stored in working memory and leaves intact the firmware stored in a non-volatile memory of the device.

Method 500 begins at block 502 and proceeds to block 504 or 506, depending on the current configuration of the device. For example, if the device follows the method of FIG. 4, method 500 proceeds to block 504. At block 504, after a bypass code is detected, the controller halts any loading of the default firmware or any ongoing memory operations to allow subsequent loading of the alternate firmware. Afterwards, or if the device is operating using method 300, method 500 proceeds to block 506. At block 506, a user of the computing system is granted access to the working memory of the device, particularly the firmware portion. In the various embodiments of the invention, such access can be direct or indirect. For example, in some embodiments, the bypass code can configure the controller to enable a path that grants a user direct access to the working memory, including the firmware portion, via the I/O interface. In other embodiments, the bypass code can configure the controller to accept commands from a user that cause the controller to modify the portions of the working memory containing the firmware.

Once user access is provided at block 506, the user can copy an alternate firmware to the working memory at block 508. For example, as described above, the user can directly write the alternate firmware to working memory or provide commands for the controller to write firmware provided at the I/O interface to the working memory. In some embodiments, once the user completes copying the alternate firmware at block 508, the user can generate a signal at block 510 that indicates to controller that copying has been completed. Afterwards, at block 512, method 500 resumes previous processing.

FIG. 6 is a flow diagram of an exemplary method 600 for the step of loading an alternate firmware in FIG. 3 or 4 after a bypass code is detected, in which the firmware is permanently upgraded. In particular, method 600 potentially results in modification of the firmware stored in both working memory and the firmware stored in a non-volatile memory of the device.

Method 600 begins at block 602 and proceeds to block 604 or 606, depending on the current configuration of the device. For example, if the device follows the method of FIG. 4, method 600 proceeds to block 604. At block 604, after a bypass code is detected, the controller halts any loading of the default firmware or any ongoing memory operations to allow subsequent loading of the alternate firmware. Afterwards, or if the device is operating using method 300, method 600 proceeds to block 606. At block 606, a user of the computing system is granted access to the working memory of the device, particularly the firmware portion. In the various embodiments of the invention, such access can be direct or indirect. For example, in some embodiments, the bypass code can configure the controller to enable a path that grants a user direct access to the working memory via the I/O interface. In other embodiments, the bypass code can configure the controller to accept commands from a user, via the I/O interface, that cause the controller to modify the portions of the working memory containing the firmware.

Once user access is provided at block 606, the user can copy an alternate firmware to working memory at block 608. For example, as described above, the user can directly write the alternate firmware to working memory or provide commands for the controller to write firmware provided at the I/O interface to the working memory. As described above, method 600 also provides for updating the firmware stored in non-volatile memory. To update the firmware in non-volatile memory, method 600 first checks at block 610 whether the firmware is upgradable. For example, the controller can be configured to have different bypass codes for different types of firmware updating. Alternatively, the device can be configured to operate in upgradeable or non-upgradeable modes. These modes can be configured using software or hardware means. For example, the controller can be pre-programmed or have other software means for rejecting any bypass codes or commands that would result in upgrading of the firmware in non-volatile memory. Alternatively, the controller can have a switch or other hardware means that disables or enables firmware update operations.

If the firmware is not upgradable at block 610, the method can proceed to block 612 or resume previous processing at block 614. If the firmware is upgradable at block 610, the method can instead proceed to block 616. At block 616, the default firmware in non-volatile memory is updated. As described above with respect to updating the default firmware in working memory, the updating can be performed directly, by allowing user direct access to the firmware at block 616, or indirectly, by generating commands for the controller to modify the contents of the firmware in non-volatile memory. In some embodiments, once the user completes copying the alternate firmware at block 608 and updating at block 616 (if applicable), the user can generate a signal at block 612 that indicates to controller that copying has been completed. Afterwards, at block 614, method 600 resumes previous processing.

Although the various embodiments of the invention have been described with respect to providing an alternate firmware for a single device, the invention is not limited in this regard. In the various embodiments of the invention, an alternate firmware can be provided for multiple device or components of a single system. For example, the processing element 112 of system 100 in FIG. 1 can provide bypass codes and alternate firmware for each component of system 100 in FIG. 1. However, the amount of power required to perform such updates can be significant and result in errors. This is conceptually illustrated in FIG. 7.

Figure 7:
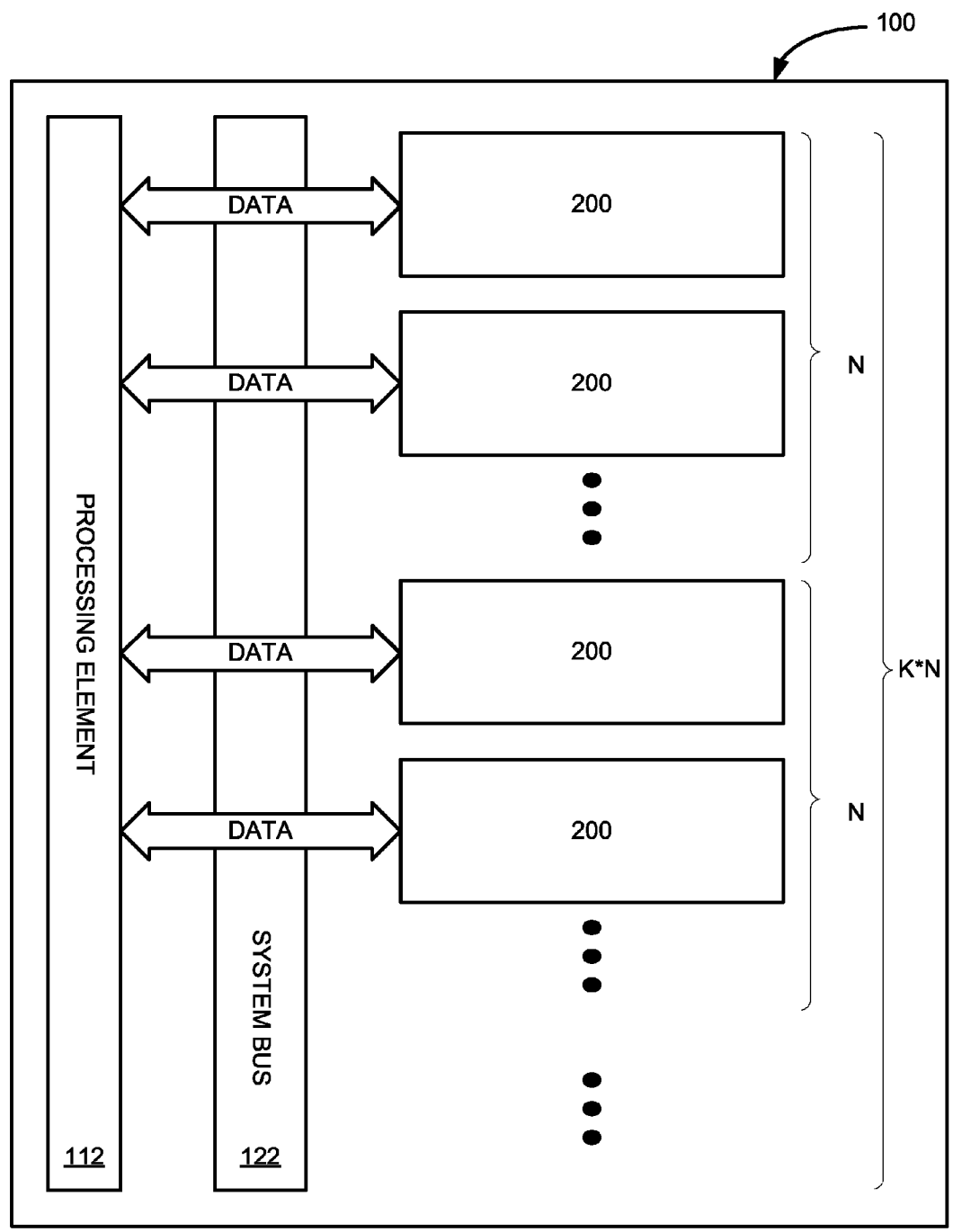
FIG. 7 is a detailed block diagram of the system in FIG. 1 with multiple instances of the exemplary electronic device in FIG. 2.

FIG. 7 is a detailed block diagram of system 100 with K*N instances of the exemplary electronic device 200 in FIG. 2. The various components of system 100 shown in FIG. 7, processing element 112, system bus 122, and devices 200 are described above in FIGS. 1 and 2. Accordingly, the description provided above is sufficient for describing the operation of these components in FIG. 7.

As described above with respect to FIG. 2, K*N devices 200 comprise memory devices, such as flash memory devices. In the case of flash memory devices, the amount of power used by the K*N devices 200 to simultaneously perform the method of FIG. 3 can cause the VCC supply voltage for one or more portions of K*N devices 200 to drop. As a result, because the VCC voltage is below the nominal operating VCC voltage for K*N devices 200, one or more errors in reading or writing data can occur during the updating process. In order to reduce or eliminate the occurrence of such errors, some embodiments of the invention provide for updating the firmware in stages. That is, rather than updating K*N devices 200 simultaneously, processing element 112 can manage the update process so that only N of K*N devices are updated at one time. The number of devices (N) being updated simultaneously can be pre-defined or determined dynamically based on the number and types of devices to be updated. One exemplary method is described below with respect to FIG. 8.

FIG. 8 is a flow diagram of an exemplary method 800 for field upgrading firmware in multiple electronic devices in accordance with an embodiment of the invention. As shown in FIG. 8, method 800 begins at block 802 and continues to block 804. At block 804, K*N devices 200 are enabled. For example, as described above with respect to FIG. 2, power can be provided to K*N devices 200 to activate an associated controller 204 or K*N devices 200 can be coupled to system bus 122 of computing system 100. As described above, enabling K*N devices 200 can cause a controller 204 in each of devices 200 to begin configuring an associated one of devices 200 for normal operations with system 100. After devices 200 are enabled at block 804, a controller 204 in each of devices 200 can proceed with loading the default firmware stored in the electronic device or load an alternate firmware provided by a coupled computing system.

After devices 200 are enabled at block 804, processing element 112 determines at block 806 whether a firmware update is available for K*N devices 200. If no update is available, the K*N devices are permitted to load their default firmware at block 808 and begin operating using the default firmware at block 810. Method 800 then resumes previous processing at block 812.

If processing element 112 determines that an update for devices 200 is available, a staged updating process can begin at block 814. First, at block 814, N of K*N devices 200 are selected for updating. Afterwards, an alternate firmware can be loaded at block 816 into the N selected devices. This can be performed in a variety of ways. For example, operations using a bypass code and alternate firmware can be generated and sent only to the I/O interface of the selected N devices. The N devices can then halt operations in the N devices responsive to the bypass code and use the alternate firmware to being an update process as described above with respect to FIGS. 3-6.

In some embodiments of the invention, following the update process at block 816, the N devices can be released for use at block 818. However, in other embodiments of the invention, the K*N devices may not be released for use by system 100 until an update of the K*N devices is completed.

Following blocks 816 and 818 (if applicable), processing element 112 can determine at block 820 whether others of the K*N devices still need updating. If other devices still need an update, the next N devices are selected by block 822 and blocks 816-822 are repeated until the K*N devices are updated. Once no other devices need updating at block 820, method 800 proceeds to block 812 to resume previous processing.

In light of the forgoing description of the invention, it should be recognized that some aspects of the invention can be realized in hardware, software, or a combination of hardware and software. A typical combination of hardware and software could be a general purpose computer processing element, with a computer program that, when being loaded and executed, controls the computer processing element such that it carries out the methods described herein. Of course, an application specific integrated circuit (ASIC), and/or a field programmable gate array (FPGA) could also be used to achieve a similar result.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others having ordinary skill in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An electronic device, comprising:
   an input/output (I/O) interface;
   a plurality of memory elements comprising a non-volatile memory portion configured to store a default firmware and a working memory portion having a firmware area;
   a controller coupled to said I/O interface and said plurality of memory elements, said controller configured to operate said plurality of memory elements according to said firmware area and to monitor said I/O interface,
   wherein said controller is configured to:
   enable a direct data path between said I/O interface and said firmware area;
   load said default firmware into said firmware area when said controller is enabled;
   operate said electronic device according to said default firmware in said firmware area;
   receive a first bypass code from said I/O interface; and
   in response to said first bypass code matching a second bypass code received by said electronic device from a computing system:
   halt operations of said electronic device;
   grant access to overwrite said default firmware in said non-volatile memory portion with an alternate firmware; and
   responsive to detecting a completion signal at said I/O interface, resume operations of said electronic device after said default firmware is overwritten.

2. The electronic device of claim 1, wherein said controller is further configured to halt said loading of said default firmware if said first bypass code matches said second bypass code and said first bypass code is received during loading of said default firmware.

3. The electronic device of claim 1, wherein said controller is configured to overwrite said default firmware in said non-volatile memory portion with said alternate firmware.

4. A computing system, comprising:
   one or more device interfaces;
   at least one processing element coupled to said one or more device interfaces, said at least one processing element configured to write data to said one or more device interfaces; and
   one or more electronic devices each coupled to a respective one of said one or more device interfaces, each of said one or more electronic devices being configured to store and load a respective default firmware into a respective firmware area of a respective working memory portion for performing memory operations, wherein each of said electronic devices is configured to:
   enable a direct data path between said respective one of said one or more device interfaces and said respective working memory portion;
   operate according to said respective default firmware in said respective firmware area; and
   receive a respective first bypass code from said respective one of said one or more device interfaces;
   in response to said respective first bypass code matching a respective second bypass code:
   halt operations of said electronic device;
   overwrite respective default firmware with an alternate firmware received from said respective one of said one or more device interfaces; and
   responsive to detecting a completion signal at said respective one of said one or more device interfaces, resume operations of said electronic device after said respective default firmware is overwritten,
   wherein said respective second bypass code is received by said electronic device from said at least one processing element.

5. The computing system of claim 4, wherein said at least one processing element is configured to:
   select a portion of said one or more said electronic devices, write said first bypass code to a device interface of said one or more device interfaces that is associated with said portion of said one or more electronic devices, and
   if said first bypass code matches said respective second bypass code of each electronic device of said portion of said one or more electronic devices and a firmware update is available for said portion of said one or more electronic devices, repeatedly write to one or more other portions of said plurality of said electronic devices.

6. The computing system of claim 4, wherein each of said electronic devices comprises:
   a plurality of memory elements, said plurality of memory elements comprising a non-volatile memory portion configured to store said respective default firmware and said respective working memory portion, said respective working memory portion having a firmware area; and
   a controller coupled to said respective one of said one or more device interfaces and said plurality of memory elements, said controller configured to load said default firmware into said respective firmware area and to grant said at least one processing element access to said respective firmware area to load said respective alternate firmware.

7. The computing system of claim 4, wherein each of said electronic devices is configured to halt loading of said respective default firmware if said first bypass code is received at said respective one of said one or more device interfaces during loading of said respective default firmware.

8. The computing system of claim 4, wherein each of said electronic devices is configured to halt memory operations if said first bypass code is received at said respective one of said one or more device interfaces after said loading of said respective default firmware.

9. The computing system of claim 4, wherein each of said electronic devices further comprises a non-volatile memory portion configured to store said respective default firmware, and wherein each of said electronic devices is configured to overwrite said respective default firmware in said non-volatile memory portion with said respective alternate firmware.

10. The computing system of claim 4, wherein said at least one processing element is configured to write said first bypass code and said alternate firmware to said one or more device interfaces.

11. A method for operating an electronic device, comprising:
    enabling a controller in said electronic device to operate a plurality of memory elements in said electronic device according to a working memory portion of said plurality of memory elements;
    receiving a first bypass code at an I/O interface of said electronic device; and
    in response to said first bypass code matching a second bypass code received by said electronic device from a computing system:
    halting operations of the electronic device;
    overwriting a default firmware stored in a non-volatile portion of said plurality of memory elements with an alternate firmware received from said I/O interface, wherein said overwriting comprises configuring said controller to enable a direct path between said I/O interface and said working memory portion; and
    responsive to detecting a completion signal at said I/O interface, resuming operations of the electronic device after the overwriting.

12. The computing system of claim 5, wherein said processing element is further configured to repeatedly write to one or more other portion of said plurality of said electronic devices such that said portion of said plurality of said electronic devices and said other portion of said plurality of said electronic devices are updated in stages.

13. The electronic device of claim 1, wherein the controller is configured to grant access to said firmware area while the controller is enabled.

14. The electronic device of claim 1, wherein said controller is configured to grant access to overwrite at least a portion of said firmware area if said first bypass code matches a third bypass code, said third bypass code being received from said computing system and being different from said second bypass code.

15. The electronic device of claim 3, wherein:
    said non-volatile memory portion includes first and second pluralities of memory devices; and
    said controller is configured to overwrite said default firmware in said non-volatile portion by overwriting only the first plurality of memory devices and, subsequently, updating the second plurality of memory devices.

* * * * *